(12) United States Patent
Masuda et al.

(10) Patent No.: US 9,207,522 B2
(45) Date of Patent: Dec. 8, 2015

(54) LIGHT SOURCE UNIT AND PROJECTOR

(71) Applicant: CASIO COMPUTER CO., LTD., Shibuya-ku, Tokyo (JP)

(72) Inventors: Hiroki Masuda, Akishima (JP); Masahiro Ogawa, Ome (JP); Osamu Umamine, Fuss (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 143 days.

(21) Appl. No.: 14/030,972

(22) Filed: Sep. 18, 2013

(65) Prior Publication Data

US 2014/0078472 A1    Mar. 20, 2014

(30) Foreign Application Priority Data

Sep. 20, 2012   (JP) ................. 2012-206666

(51) Int. Cl.
| | |
|---|---|
| *G03B 21/00* | (2006.01) |
| *G03B 21/14* | (2006.01) |
| *F21V 9/08* | (2006.01) |
| *F21V 13/08* | (2006.01) |
| *G03B 21/20* | (2006.01) |
| *H04N 9/31* | (2006.01) |

(52) U.S. Cl.
CPC ............... *G03B 21/142* (2013.01); *F21V 9/08* (2013.01); *F21V 13/08* (2013.01); *G03B 21/204* (2013.01); *G03B 21/208* (2013.01); *G03B 21/2013* (2013.01); *H04N 9/3161* (2013.01)

(58) Field of Classification Search
CPC . G03B 21/204; G03B 21/2013; H04N 9/3161
USPC ................. 353/31, 34, 37, 84, 85, 94, 98, 99; 362/19, 84, 231
See application file for complete search history.

(56) References Cited

U.S. PATENT DOCUMENTS

| | | | |
|---|---|---|---|
| 2011/0242496 A1* | 10/2011 | Kimoto et al. ................... | 353/31 |
| 2012/0081674 A1* | 4/2012 | Okuda ............................. | 353/20 |
| 2012/0154767 A1* | 6/2012 | Kimura et al. .................. | 353/98 |
| 2012/0268503 A1* | 10/2012 | Sugiyama et al. ............. | 345/690 |
| 2012/0327374 A1* | 12/2012 | Kitano et al. ................... | 353/31 |
| 2014/0125956 A1* | 5/2014 | Chifu et al. ..................... | 353/31 |

FOREIGN PATENT DOCUMENTS

JP       2012-042964 A     3/2012

* cited by examiner

*Primary Examiner* — Sultan Chowdhury
(74) *Attorney, Agent, or Firm* — Holtz, Holtz, Goodman & Chick PC

(57) ABSTRACT

The invention includes an excitation light source, a light distribution adjusting member on which excitation light from the excitation light source is incident, and a luminescent material which emits luminous light of a different wavelength from that of the excitation light by the excitation light which passes through the light distribution adjusting member being shone on thereto, wherein the excitation light source is disposed so that the excitation light is incident on a light incident surface of the light distribution adjusting member at a predetermined angle.

11 Claims, 11 Drawing Sheets

LIGHT SOURCE UNIT AND PROJECTOR

CROSS-REFERENCE TO RELATED APPLICATION

This application is based upon and claims the benefit of priority under 35 USC 119 of Japanese Patent Application No. 2012-206666 filed on Sep. 20, 2012, the entire contents of which are incorporated herein by reference.

BACKGROUND OF THE INVENTION

1. Field of the Invention

The present invention relates to a light source unit capable of emitting a pencil of light having high in-plane uniformity and a projector.

2. Description of the Related Art

In these days, data projectors are used on many occasions as an image projection unit which projects images including an image of a screen and a video image of a personal computer, as well as images based on image data which is stored in a memory card on to a screen. In these data projectors, light emitted from a light source is caused to converge to a micromirror display element called a DMD (Digital Micromirror Device) or a liquid crystal panel so that a color image is displayed on a screen.

Conventionally, the mainstream of these projectors has been those which utilize a high-intensity discharge lamp as a light source. In recent years, however, there have been made various developments on projectors which use, as a light source, a light emitting diode, a laser diode, an organic EL device or a luminescent material.

The applicant of this patent application proposes in JP-A-2012-42964 a light source unit which includes a blue laser emitting device as an excitation light source, a luminescent wheel on which a luminous light emitting area is disposed circumferentially which is formed by laying a green luminescent material on a reflecting surface, and a red light emitting diode and a blue light emitting diode. In this proposal, light emitted from the red light emitting diode constitutes light source light of a range of red wavelengths, light emitted from the blue light emitting diode constitutes a light source light of a range of blue wavelengths, and luminous light emitted from the green luminescent material by using light emitted from the blue light emitting device as excitation light constitutes light source light of a range of green wavelengths.

Although the light source unit uses the blue laser emitting device and the green luminescent material as a green light source, when blue laser light functioning as excitation light is shone on to the luminescent material, unevenness in in-plane uniformity of light is produced in the whole of the pencil of light as excitation light, and therefore, it has been difficult to ensure the in-plain uniformity of luminous light emitted from the luminescent material as well.

SUMMARY OF THE INVENTION

The present invention has been made in view of these situations and an object thereof is to provide a high-intensity light source unit which can emit a pencil of light of higher in-plane uniformity by eliminating the problem described above and hence a projector which enables the projection of an image of little unevenness in luminance.

According to a preferred aspect of the invention, there is provided a light source unit having an excitation light source, a light distribution adjusting member on which excitation light from the excitation light source is incident, and a luminescent material which emits luminous light of a different wavelength from that of the excitation light by the excitation light which passes through the light distribution adjusting member being shone on thereto, wherein the excitation light source is disposed so that the excitation light is incident on a light incident surface of the light distribution adjusting member at a predetermined angle.

Further, according to another preferred aspect of the invention, there is provided a projector including a light source unit, a light-source-side optical system which guides light from the light source unit to a display element, a display element which forms an optical image by light shone on thereto, a projection-side optical system which projects an optical image formed by the display element on to a screen, and a projector control unit having a light source control device for the light source unit and a display element control device, wherein the light source unit is the light source unit according to the preferred aspect of the invention.

BRIEF DESCRIPTION OF THE SEVERAL VIEWS OF THE DRAWINGS

The above and further objects, characteristics and advantages of the invention will be more obvious from the following detailed description along with accompanying drawings. Here.

DETAILED DESCRIPTION OF THE PREFERRED EMBODIMENT

Hereinafter, a best mode for carrying out the invention will be described by the use of the accompanying drawings. However, although various limitations which are technically preferable to carry out the invention are given to an embodiment which will be described below, the scope of the invention should not be limited at all to the following embodiment and illustrated examples shown in the accompanying drawings.

Figure 3:
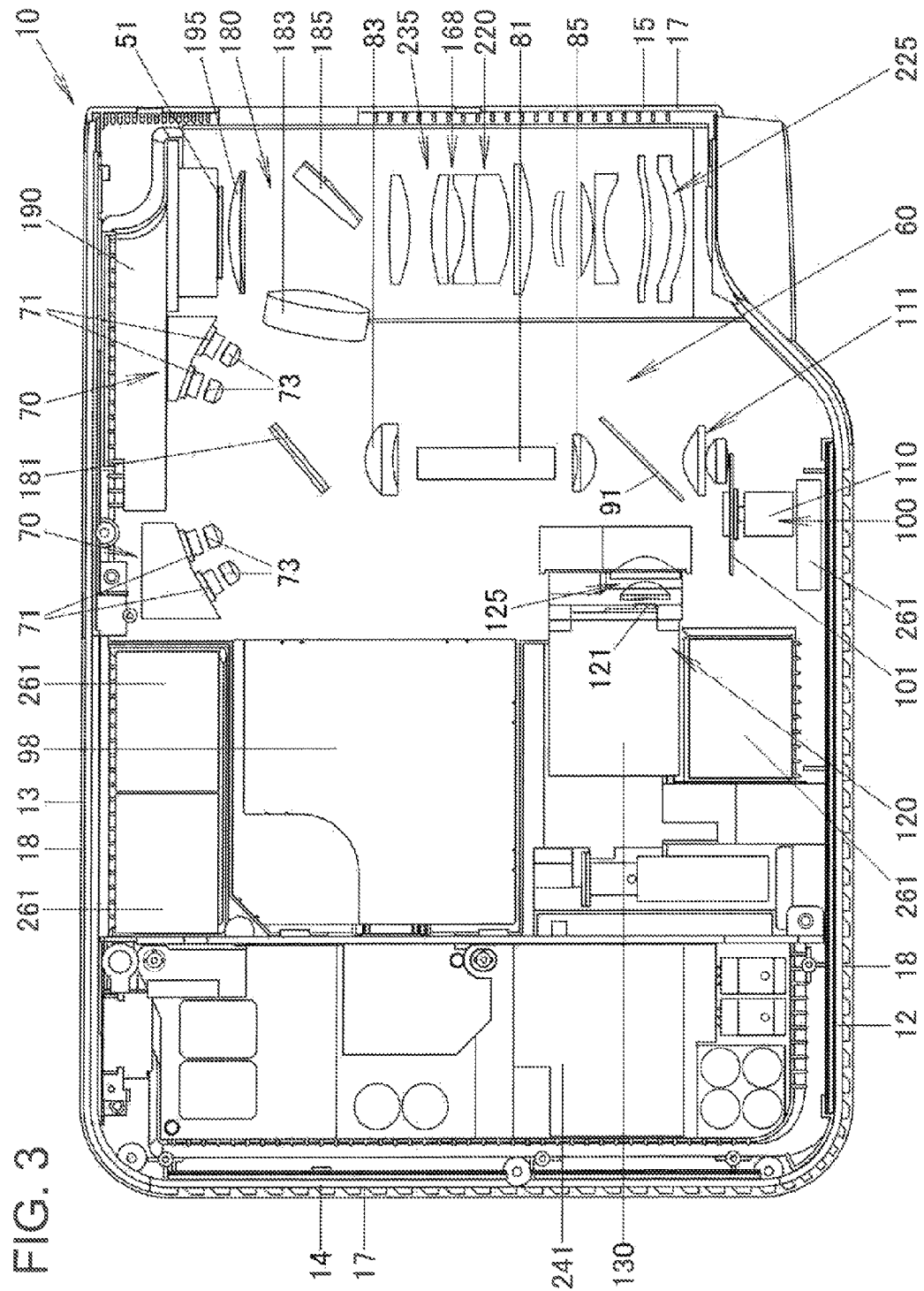
FIG. 3 is an exemplary plan view showing an internal construction of the projector according to the embodiment of the invention.

A best mode of a light source unit for a projector according to the invention has, as shown in FIG. 3, excitation light sources 70, a light tunnel 81 as a light distribution adjusting member through which excitation light from the excitation light sources 70 passes, and a luminescent wheel 101 which includes a luminescent material on to which excitation light which passes through the light tunnel 81 is shone. Then, luminous light emitted from the luminescent material by excitation light or the like passes through the light tunnel 81 in an opposite direction to the direction in which excitation light passes therethrough. The luminescent material is formed on the luminescent wheel 101 as an annular luminescent material layer 103, and this annular luminescent material layer 103 is disposed on the luminescent wheel 101 so as to extend along a circumferential edge thereof in such a way as to be arranged continuously with an arc-shaped diffuse reflection portion 105 in an end-to-end fashion.

Then, the excitation light sources 70 each use a plurality of blue light sources 71 which are laser emitting devices which emit light of a range of blue wavelengths. The luminescent material is a luminescent material which emits light of a range of green wavelengths. A dichroic mirror 91 is provided between the light tunnel 81 and the luminescent wheel 101, and this dichroic mirror 91 reflects light of a range of red wavelength and transmits light of the range of blue wavelengths and light of the range of green wavelengths. Light of a range of red wavelengths emitted from a red light emitting device 120 is reflected by the dichroic mirror 91 so that the direction of an axis of luminous light which passes through the dichroic mirror 91 and the direction of an axis of light of the range of red wavelengths coincide with each other.

Figure 1:
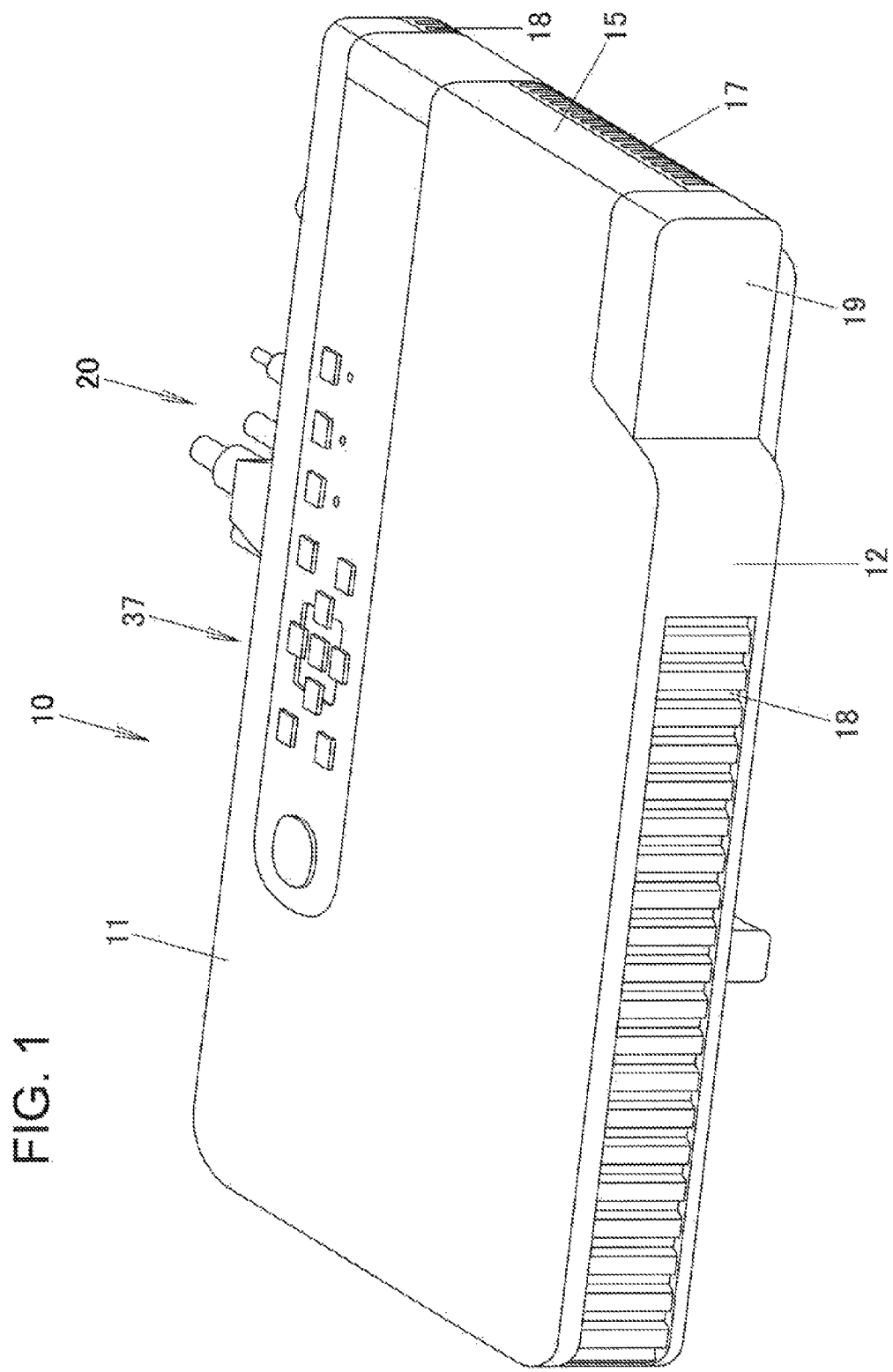
FIG. 1 is an external perspective view showing a projector according to an embodiment of the invention.

Hereinafter, an embodiment of the invention will be described in detail based on the drawings. FIG. 1 is an external perspective view of a projector 10. In this embodiment, when left and right are referred to with respect to the projector 10, they denote, respectively, left and right with respect to a projecting direction, and when front and rear are referred to with respect to the projector 10, they denote, respectively, front and rear with respect to a direction towards a screen and the traveling direction of a pencil of light emitted from the projector 10 towards the screen.

As is shown in FIG. 1, the projector 10 has a substantially rectangular parallelepiped shape. The projector 10 has a lens cover 19 for covering a projection port which is laid to a side of a front panel 12 which is referred to as a front side panel of a projector casing. Additionally, a plurality of outside air inlet slits 18 are provided in the front panel 12. Further, although not shown, the projector 10 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where USB terminals, an image signal input D-SUB terminal, an S terminal, an RCA terminal and the like are provided and various types of terminals 20 including a power supply adaptor plug. Additionally, a plurality of outside air inlet slits 18 are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15.

Figure 2:
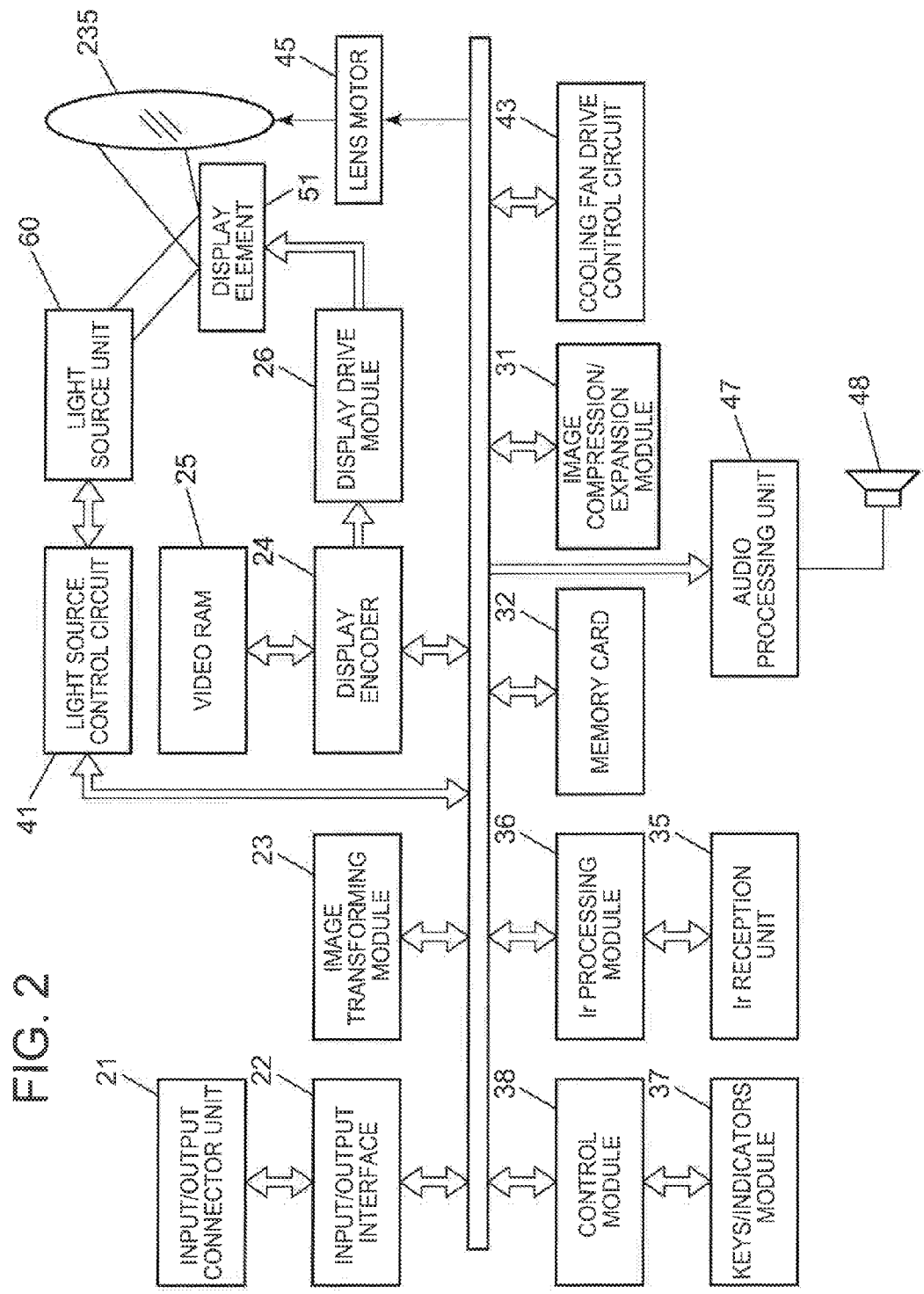
FIG. 2 is a block diagram showing a functional circuit block of the projector according to the embodiment of the invention.

Next, the projector control unit of the projector 10 will be described by the use of a functional block diagram shown in FIG. 2. The projector control unit includes a control module 38, an input/output interface 22, an image transforming module 23, a display encoder 24, a display drive module 26 and the like, whereby image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive module 26.

The display drive module 26 functions as a display element control module and drives the display element 51, which is a spatial optical modulator (SOM), at an appropriate frame rate in response to the image signal outputted from the display encoder 24.

In this projector 10, a pencil of light which is emitted from a light source unit 60 is shone on to a display element 51 via a light-source-side optical system to thereby form an optical image based on reflected light which is reflected by the display element 51. The image so formed is then projected on to a screen, not shown, for display thereon via a projection-side optical system, which will be described later. In addition, a movable lens group 235 of the projection-side optical system is driven by a lens motor 45 for zooming or focusing.

An image compression/expansion module 31 performs a recording operation in which a luminance signal and a color difference signal of an image signal are data compressed through processing such as ADCT and Huffman coding and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images based on the image data stored on the memory card 32.

The control module 38 governs the control of respective operations of circuitries within the projector 10 and is made up of a CPU, a ROM which stores in a fixed fashion operation programs of various types of settings and a RAM which is used as a work memory.

Operation signals generated at the keys/indicators module 37 which is made up of the main keys and indicators provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls individually the emission of light from the light emitting elements of the excitation light source devices 70 of the light source unit 60 and a light emitting element of the red light emitting device 120 so that light source light of predetermined ranges of wavelengths which is required when an image is generated is emitted from the light source unit 60. Further, the control module 38 controls a wheel motor 110 to drive rotationally the luminescent wheel 101 which is a rotational member of a luminous light emitting device 100.

Further, the control module 38 causes a cooling fan drive control circuit 43 to detect temperatures through a plurality of temperature sensors which are provided in the light source unit 60 and the like so as to control individually the rotating speed of cooling fans based on the results of the temperature detection. Additionally, the control module 38 also causes the cooling fan drive control circuit 43 to keep the cooling fan rotating even after the power supply to a projector main body is switched off by use of a timer or the like. Alternatively, the control module 38 controls whether to cut off the power supply to the projector main body depending upon the results of the temperature detections by the temperature sensors.

Next, an internal construction of the projector 10 will be described. FIG. 3 is an exemplary plan view showing an internal construction of the projector 10. As shown in FIG. 3, the projector 10 includes a control circuit board 241 in proximity to the right panel 14. This control circuit board 241 includes a power supply circuit block, a light source control block and the like. Additionally, the projector 10 includes the light source unit 60, in a substantially central portion of the projector casing.

Further, the projector 10 includes a light-source-side optical system 180 and a projection-side optical system 220 between the light source unit 60 and the left panel 15. In addition, the projection-side optical system 220 is disposed along the left panel 15, and the display element 51, which is a DMD (Digital Micromirror Device), is provided at the rear of the projection-side optical system 220 and near the back panel 13, whereby light emitted from the light source unit 60 is guided to the display element 51 by the light-source-side optical system 180.

Figure 4:
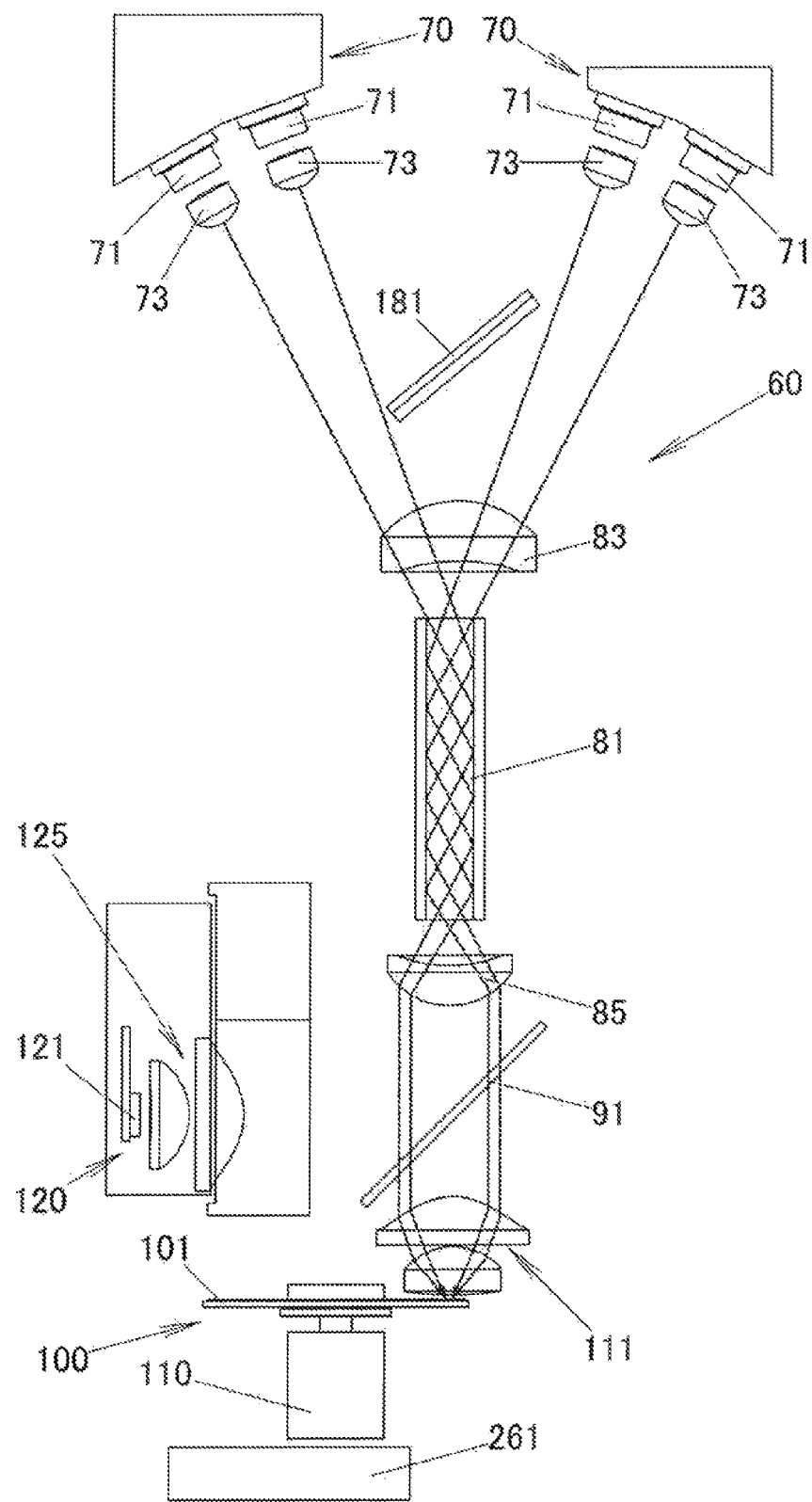
FIG. 4 shows a construction example of a light source unit and an optical path example of excitation light according to the embodiment of the invention.

As shown in FIGS. 3 and 4, the light source unit 60 includes the excitation light source devices 70 which are disposed in a substantially central portion with respect to a left-to-right direction of the projector casing and near the back panel 13, the light tunnel 81, which is the light distribution adjusting member, disposed substantially in the center of the projector casing, a collective lens 83 disposed on a side of the light tunnel 81 which faces the back panel 13 and a collective lens 85 disposed on a side of the light tunnel 81 which faces the front panel 12, and the luminous light emitting device 100 disposed near to the front panel 12 so that a pencil of light emitted from the excitation light source device 70 is shone on to the luminous light emitting device 100 via the light tunnel 81.

Further, the light source unit 60 also includes the red light emitting device 120 disposed between the excitation light source devices 70 and the luminous light emitting device 100 and the dichroic mirror 91 (corresponding to a first dichroic mirror) disposed between the light tunnel 81 and the luminous light emitting device 100. The dichroic mirror 91 reflects light of the range of red wavelengths and transmits light of the range of blue wavelengths and light of the range of green wavelengths. Then, the dichroic mirror 91 reflects light emitted from the red light emitting device 120 so that the axis of the red light coincides with the axis of light emitted from the luminous light emitting device 100, whereby light of the ranges of red, green and blue wavelengths is allowed to pass through the light tunnel 81 for emission from the light source unit 60.

In addition, the light source unit 60 as shown in FIGS. 3 and 4 has a light axis changing mirror 181 of the light-source-side optical system 180 which is located between the excitation light source device 70 and the light tunnel 181 and which is supposed to be situated on an central axis which coincides with an optical axis of the light tunnel 81.

The excitation light sources 70 each include a light source group made up of a plurality of blue light sources 71 as excitation light sources which are disposed near the back panel 13 and heat sinks 98, 190 which are disposed between the blue light sources 71 and the right panel 14 and near the back panel 13, respectively.

In the light source group, collimator lenses 73 are disposed individually on respective optical axes of the blue light sources 71, and the collimator lenses 73 convert light emitted from the corresponding blue light sources 71 into substantially parallel light so as to enhance the directivity of the light. Additionally, a cooling fan 261 is disposed between the heat sink 98 and the back panel 13, and the blue light sources 71 of the excitation light source devices 70 are cooled by the cooling fan 261 and the heat sinks 98, 190.

Then, respective pencils of light emitted from the blue light sources 71 are caused to enter the light tunnel 81, which is the light distribution adjusting member, obliquely via the collective lens 83. This light tunnel 81 is such that light entering the light tunnel 81 is internally reflected a plurality of times in an interior thereof so as to enhance the in-plane uniformity of light which is to emanate therefrom.

In addition, light emitted from the excitation light source devices 70 enters the light tunnel 81 via the collective lens 83 after passing by sides of the light axis changing mirror 181 of the light-source-side optical system 180 which is disposed on the central axis of the light tunnel 81.

Consequently, excitation light which enters the light tunnel 81 is reflected a plurality of times on an inner wall of the light tunnel 81, whereafter the excitation light is shone on to the luminescent wheel 101 of the luminous light emitting device 100 via the collective lens 85.

In this embodiment, the excitation light sources are disposed by adjusting the position and orientation of the blue light sources 71 and the orientation and position of the collimator lenses 73 so that respective pencils of light emitted from the blue light sources 71 do not enter the light axis changing mirror 181 but enter a light incident surface of the light tunnel 81.

Alternatively, the diffuse reflection area of the luminescent wheel 101, which will be described in details later, may be converted into an area of a luminescent material which emits blue light of a different range of blue wavelengths from that of light emitted from the blue light sources 71 by light from the blue light sources 71 being shone on thereto. In addition, the light axis changing mirror 181 may be converted into a dichroic mirror which transmits light from the excitation light sources and reflects light of the range of green wavelengths and light of the range of blue wavelengths which are emitted from the luminescent wheel 101 and light of the range of red wavelengths which is emitted from the red light emitting device 120.

In this way, by causing respective pencils of light emitted from the blue light sources 71 to enter the light incident surface of the light tunnel 81 obliquely, the excitation light that enters the light tunnel 81 in that way is allowed to be reflected a certain number of more of times within the light tunnel 81 so as to preferably enhance the in-plane uniformity of the excitation light emanating from the light tunnel 81.

In addition, as shown in FIG. 4, the plural pairs of blue light sources 71 are disposed in symmetrical positions with respect to a straight line which passes through a middle point of the light incident surface of the light tunnel 81 and which is normal to the light incident surface, whereby the pairs of blue light sources 71 are disposed inclined at the same angle towards the light tunnel 81. Namely, a pencil of excitation light emitted from one of the pairs of blue light sources 71 enters the light tunnel 81 while being inclined at a first angle with respect to the straight line normal to the light incident surface of the light tunnel 81, and a pencil of excitation light emitted from the other pair of blue light sources 71 enters the light tunnel 81 while being inclined at a second angle which is equal in magnitude to the first angle with respect to the straight line normal to the light incident surface.

By disposing the blue light sources 71 in this way, light shone from the pairs of blue light sources 71 which are disposed in the symmetrical positions with respect to the central axis of the light tunnel 81 can be reflected the same number of times within the light tunnel 81, thereby making it possible to preferably enhance the in-plane uniformity of light which is to emanate from the light tunnel 81.

The entry of pencils of excitation light into the light tunnel 81 is not limited to the entry with the axes of the pencils of excitation light from the pairs of blue light sources 71 inclined symmetrically with respect to the central axis of the light tunnel 81, and hence, any type of entry of excitation light should be accepted as long as excitation light from the pairs of blue light sources 71 enters the light incident surface of the light tunnel 81 and then passes through the light tunnel 81 to be collected to a required position on the luminescent wheel 101 by the collective lens 85. Thus, there may be a situation in which angles of incidence differ from each other at which pencils of excitation light from the pairs of blue light sources 71 enter the light tunnel 81.

The luminous light emitting device 100 includes the luminescent wheel 101, which is the rotational member thereof, disposed so as to be parallel to the front panel 12 or intersect the central axis of the light tunnel 81 at right angles, the wheel motor 110 which drives rotationally the luminescent wheel 101 and a group of collective lenses 111 which not only collects a pencil of light emanating from the light tunnel 81 to the luminescent wheel 101 but also collets a pencil of light emitted from the luminescent wheel 101 in the direction of the back panel 13.

Figure 5:
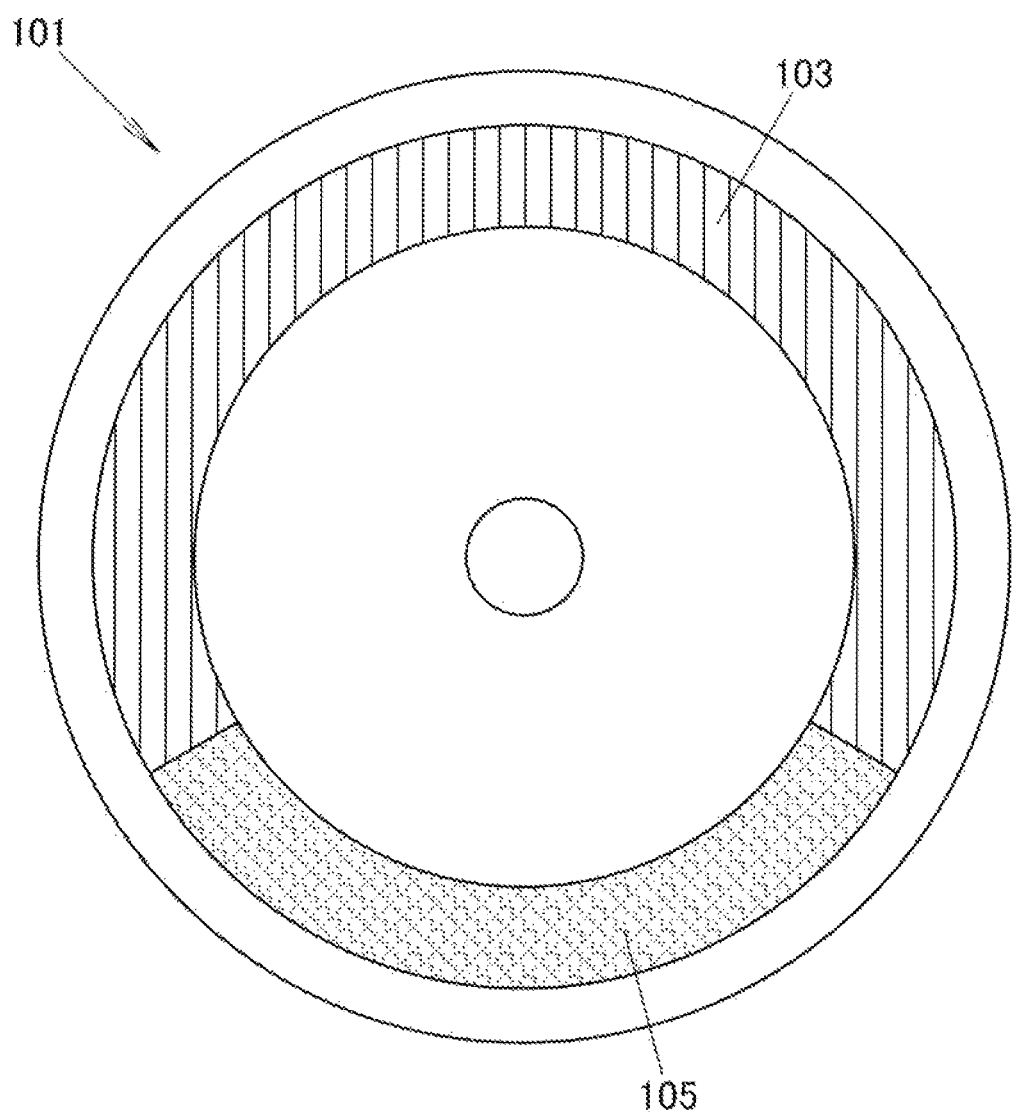
FIG. 5 is a front view showing an example of a luminescent wheel according to the invention.

The luminescent wheel is formed by using a thin circular disk-shaped metallic base of copper, aluminum or the like. As shown in FIG. 5, the luminescent material 103 and the diffuse reflection portion 105 are provided on one side of the luminescent wheel 101 so as to be disposed circumferentially along a circumferential edge of the luminescent wheel 101 in an end-to-end fashion. The luminescent material 103 is configured as a green luminous light emitting area which emits luminous light of the range of green wavelength by receiving light emanating from the light tunnel 81 as excitation light. The diffuse reflection portion 105 is configured as a diffuse reflection area which reflects light shone on thereto from the light tunnel 81 while diffusing it.

A portion of a surface of the base which faces the back panel 13 where the green luminous light emitting area is to be formed is mirror finished through silver deposition. The luminescent material 103, which is the green luminescent material, is laid on the mirror-finished surface. Further, minute irregularities are formed on a portion of the surface of the metallic base where the diffuse reflection area is to be formed through sandblasting, whereby the diffuse reflection portion 105 is formed which reflects incident light while diffusing it.

It is noted that there may be a situation in which the diffuse reflection area is converted into a light transmitting diffuse reflection portion by forming a diffuse transmission layer which transmits light while diffusing it on a mirror-finished surface of the metallic base which is mirror finished in a similar way to that in which the green luminous light emitting area is done. The light transmitting diffuse reflection area so formed functions in the same way as that of the diffuse reflection portion 105 which is subjected to sandblasting and hence reflects incident light while diffusing it.

Then, light shone on to the green luminous light emitting area on the luminescent wheel 101 from the excitation light source devices 70 by way of the light tunnel 81 excites the green luminescent material in the green luminous light emitting area to emit green luminous light. Pencils of green luminous light are emitted from the green luminescent material in every direction, and some travel directly towards the back panel 13 and others are reflected on the surface of the luminescent wheel 101 so as to travel towards the back panel 13. Thereafter, these pencils of green luminous light enter the group of collective lenses 111 to be collected and emanate therefrom towards the light tunnel 81, as shown in FIG. 6.

Light shone on to the diffuse reflection area of the luminescent wheel 101 from the excitation light source devices 70 enters the group of collective lenses 111 as diffused reflected light which is diffused by the minute irregularities to be collected and thereafter emanates therefrom towards the light tunnel 81. A cooling fan 261 is disposed between the wheel motor 110 and the front panel 12, whereby the luminous light emitting device 100 and the like are cooled by this cooling fan 261.

The red light emitting device 120 is a monochromatic light emitting device which includes the red light emitting element 121 which is disposed so that an optical axis thereof intersects the axis of light emanating from the light tunnel 81 at right angles and a group of collective lenses 125 which collects light emitted from the red light emitting element 121. This red light emitting element 121 is a red light emitting diode which emits light of a range of red wavelengths.

Figure 6:
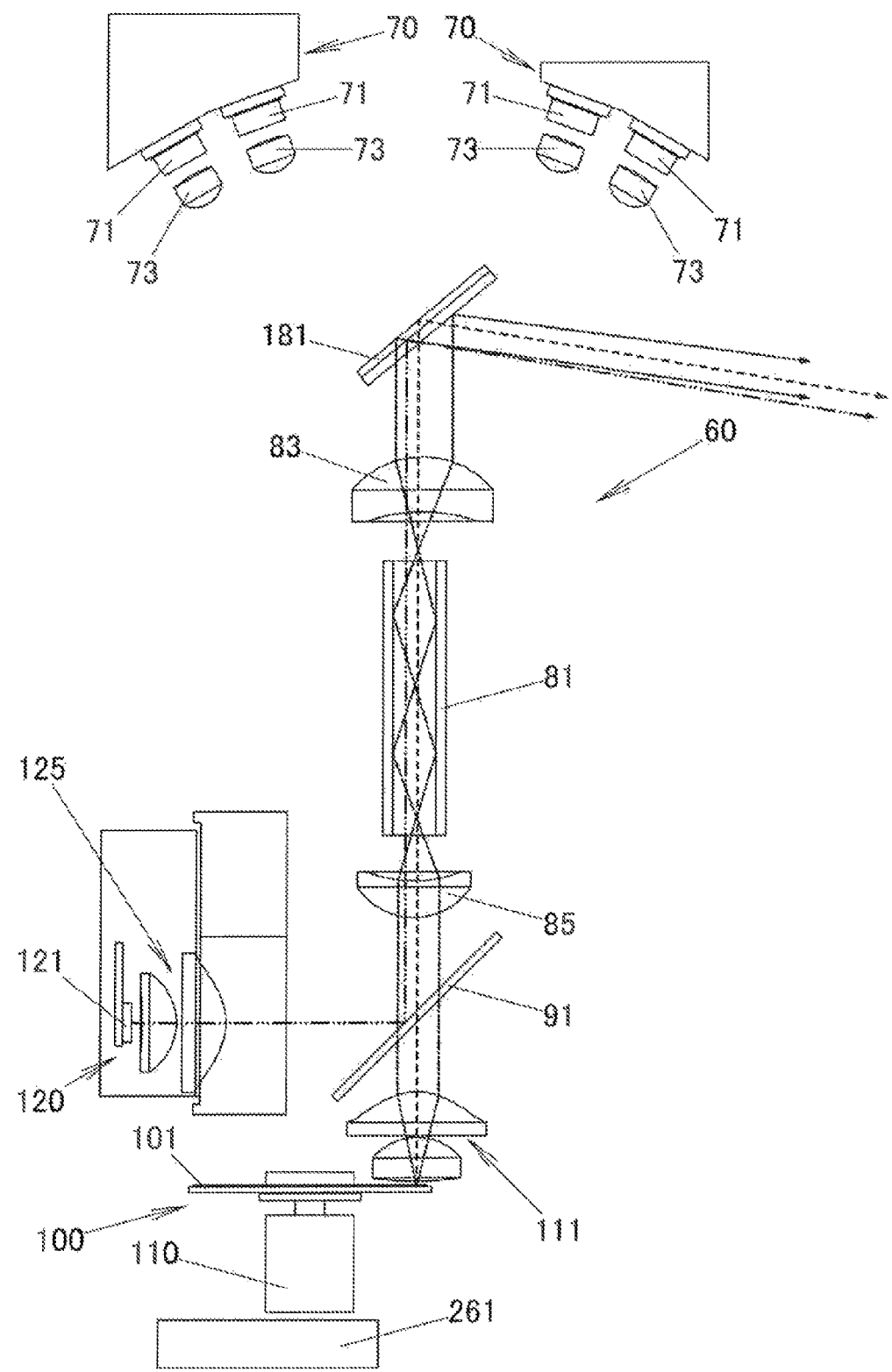
FIG. 6 shows an optical path example of light emitted from the light source unit according to the embodiment of the invention.

As shown in FIG. 6, light emitted from the red light emitting device 120 is shone on to the dichroic mirror 91 to be reflected by the dichroic mirror 91 and enters the light tunnel 81 via the collective lens 85 with the axis of the red light caused to coincide with the axis of luminous light which is light of the range of green wavelengths emitted from the luminescent wheel 101 and the axis of light of the range of blue wavelengths reflected by the luminescent wheel 101.

The red light emitting device 120 includes a heat sink 130 which is disposed at a side of the red light emitting element 12 which faces the right panel 14. Additionally, a cooling fan 261 is disposed between the heat sink 130 and the front panel 12, whereby the red light emitting element 121 is cooled by this cooling fan 261. It is noted that in FIG. 6, although pencils of luminous light emitted in every direction from the green luminescent material, light shone on to the diffuse reflection area from the excitation light source devices 70, and light emitted from the red light emitting device 120 are shown only by their central axes, in reality, it is, of course, natural to think that the light emitted from the luminescent material and the light source and light emitting devices passes through the light tunnel 81 while being reflected internally.

In addition, the light-source-side optical system 180 is designed to guide light emitted from the light source unit 60 to the display element 51 and includes, as shown in FIG. 3, the light axis changing mirror 181, the collective lens 183 and a light shining mirror 185.

The light axis changing mirror 181 is disposed on the optical axis of the light tunnel 81 and is designed to reflect light of the range of red wavelengths, light of the range of green wavelengths and light of the range of blue wavelengths which emanate from the light tunnel 81 and pass through the collective lens 183 in the direction of the left panel 15 so as to change the axes of the red, green and blue light emanating from the light tunnel 81 towards the back panel 13 in the direction of the left panel 15.

Then, the red, green and blue light reflected by the light axis changing mirror 181 is shone on to the light shining mirror 185 via the collective lens 183 and is shone on to the display element 51, which is the DMD, by the light shining mirror 185. Then, red, green and blue images are formed based on the light in the display element 51, and the light forming these monochromatic images of the three primary colors is caused to enter the projection-side optical system 220.

A heat sink 190 to cool the display element 51 is disposed between the display element 51 and the back panel 14, whereby the display element 51 is cooled by this heat sink 190. Additionally, a collective lens 195 as part of the projection-side optical system 220 is disposed near the front of the display element 51.

The projection-side optical system 220 is a variable-focus lens which includes a group of fixed lenses 225 which is incorporated in a fixed lens barrel and a group of movable lenses 235 which is incorporated in a movable lens barrel, thus a zooming function being given to the variable-focus lens. The group of movable lenses 235 is moved by a lens motor for zooming and focusing.

By configuring the projector 10 in this way, when the luminescent wheel 101 is rotated and light is emitted at different timings from the excitation light source devices 70 and the red light emitting device 120, light of the range of red wavelength, light of the range of green wavelengths and light of the range of blue wavelengths are caused to enter sequentially the light tunnel 81 so as to enhance the respective in-plane uniformities of the red, green and blue light, whereafter the red, green and blue light enters the display element 51 via the light-source-side optical system 180.

Because of this, the DMD, which is the display element 51 of the projector 10, forms red, green and blue images according to data, and by superposing the monochromatic images free from unevenness of luminance one on top of another, a color image can be produced on the screen.

Figure 7:
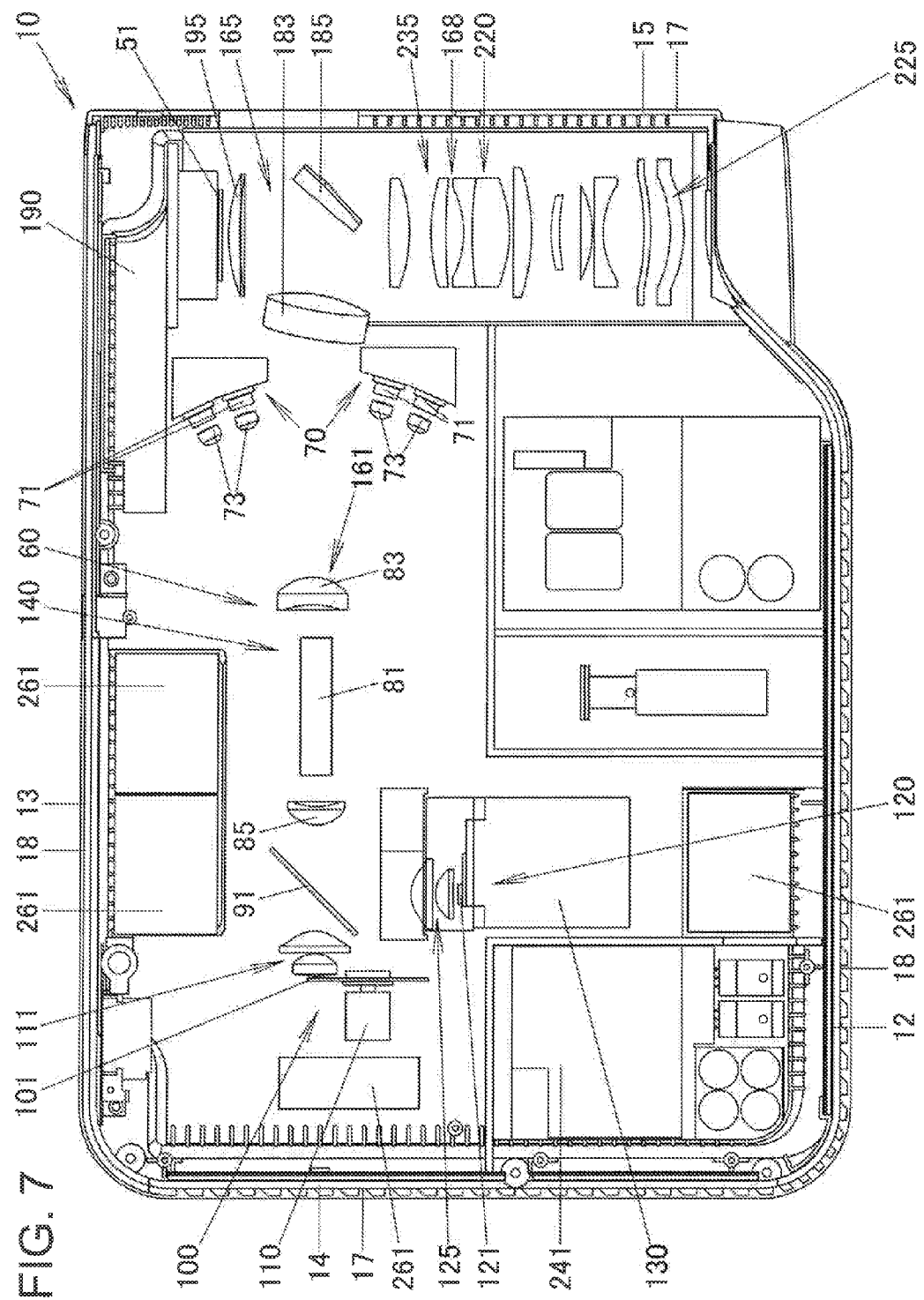
FIG. 7 is an exemplary plan view showing an internal construction of the projector incorporating another light source unit according to the embodiment of the invention.

In the embodiment, while the light-source-side optical system 180 which guides light emitted from the light source unit 60 to the display element 51 is described as having the light axis changing mirror 181, so that the axes of red light, green light and blue light emanating from the light tunnel 81 towards the back panel 13 are changed in the direction of the left panel 15, by adopting a light source unit 60 in which an central axis of a light tunnel 81 is made substantially parallel to the back panel 13 as shown in FIG. 7, a light-source-side optical system 180 is realized from which the light axis changing mirror 181 is omitted, so that luminous light which passes through the light tunnel 81, which is the light distribution adjusting member, or the like is shone directly on to the display element 51 from the light source unit 60 via a collective lens 183 of the light-source-side optical system 180.

Figure 8:
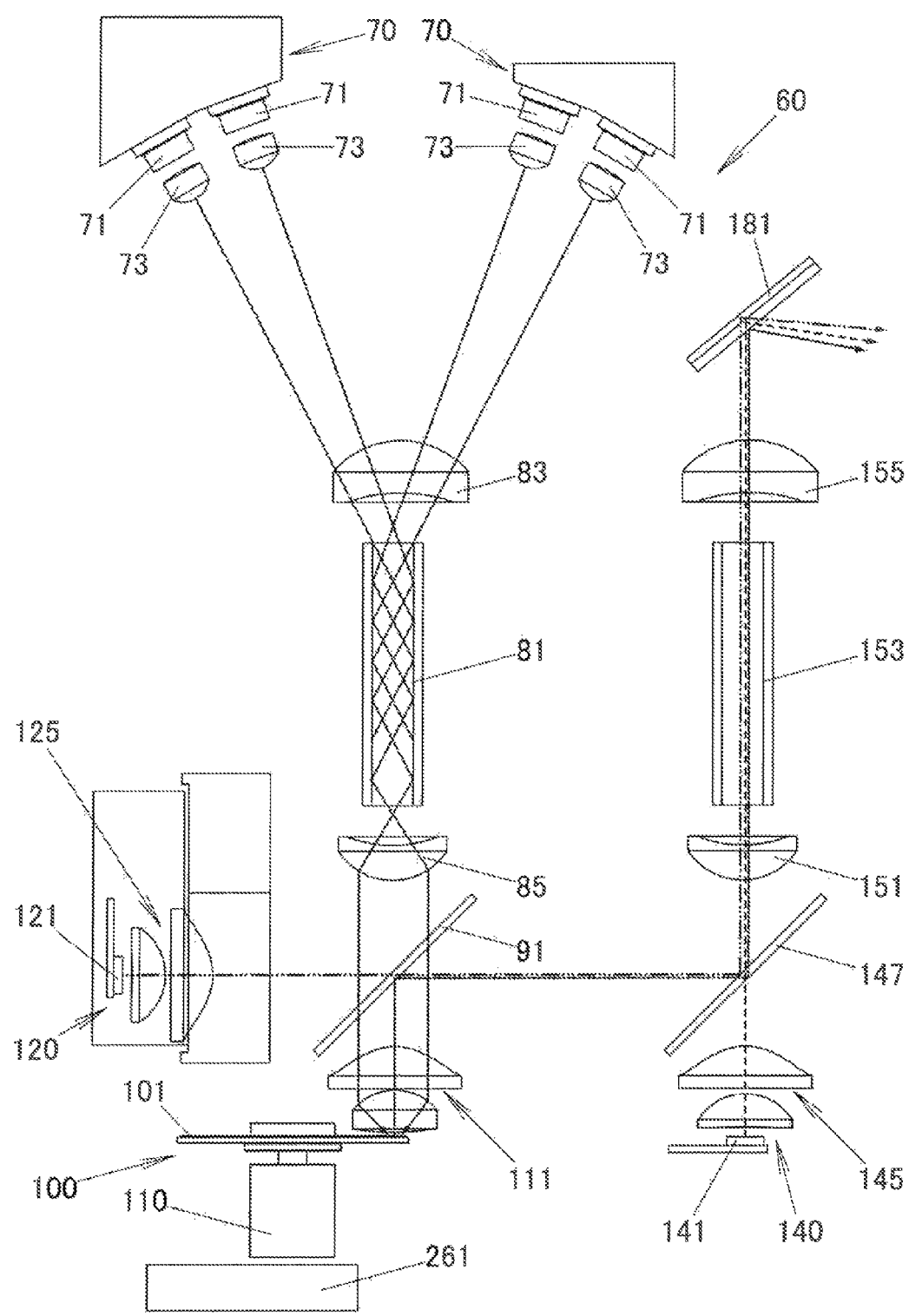
FIG. 8 shows another construction example for the light source unit according to the embodiment of the invention.

Further, in the embodiment, while the luminescent wheel 101 is described as being disposed on the central axis of the light tunnel 81 and luminous light and reflected light emitted from and reflected by the luminescent wheel 101 and light emitted from the red light emitting device 120 are described as being caused to pass through the light tunnel 81 through which excitation light from the excitation light source devices 70 is allowed to pass so as to be shone on to the luminescent wheel 101 in the opposite direction to the direction in which excitation light passes therethrough, as in a conventional light source unit, a light tunnel 153 exclusive for light to be emitted from the light source unit 60 may be provided as shown in FIG. 8 so that light to be emitted from the light source unit 60 passes therethrough to be reflected a plurality of times in an interior thereof so as to enhance the in-plane uniformity of such light.

As this occurs, the dichroic mirror 91 which is disposed on the axis of light emitted from the red light emitting device 120 is converted into a dichroic mirror 91 which reflects luminous light emitted from the luminescent wheel 101 of the luminous light emitting device 100 and transmits excitation light and light of the range of red wavelengths emitted from the red light emitting device 120, so that the axis of light of the range of red wavelengths emitted from the red light emitting device 120 and the axis of light of the range of green wavelengths emitted from the luminescent wheel 101 are caused to coincide with each other in a direction which differs from the axis of excitation light.

Further, a second dichroic mirror 147 is disposed in a position where the axis of light of the range of red wavelength emitted from the red light emitting device 120 which has passed through the dichroic mirror 91 intersects the axis of light of a range of blue wavelengths emitted from a blue light emitting device 140. This second dichroic mirror 147 reflects luminous light emitted from the luminescent wheel 101 of the luminous light emitting device 100 and light of the range of red wavelengths emitted from the red light emitting device 120 whose axes are caused to coincide with each other by the dichroic mirror 91 and transmits light of the range of blue wavelengths.

In this way, light of the range of blue wavelengths from the blue light emitting device 140 is added to light of the range of red wavelengths and light of the range of green wavelengths by the second dichroic mirror 147. Then, light of the ranges of red, green and blue wavelengths, which are the three primary colors, is caused to enter the light tunnel 153 exclusive for light to be emitted from the light source unit 60 for emission therefrom. Separately from the light tunnel 153 exclusive for light to be emitted, a light tunnel 81 exclusive for excitation light is disposed between excitation light sources 70 and the luminous light emitting device 100, whereby excitation light is shone on to the luminescent wheel 101 via this light tunnel 81.

The blue light emitting device 140 is a monochromatic light emitting device which has a blue light emitting element 141 which is a blue light emitting diode and a group of collective lenses 145 which collects light emitted from the blue light emitting element 141.

In FIG. 8, although pencils of luminous light emitted from the green luminescent material in every direction, light emitted from the blue light emitting device 140 and light emitted from the red light emitting device 120 are illustrated only by their central axes, in reality, it is, of course, natural to think that the light emitted from the luminescent material and the light emitting devices passes through the light tunnel 153 while being reflected internally.

In addition, when the blue light emitting device 140 is used, as the luminescent wheel 101, the diffuse reflection portion 105 does not have to be formed thereon, and it is good enough to form only a luminescent material layer 103 which is an annular green luminous light emitting area along the full circumference of the luminescent wheel 101.

In addition, the following configuration may be adopted. Only a green luminescent material is formed into an annular shape on the luminescent wheel 101, and as a device for emitting light of a range of blue wavelengths, a blue light emitting device 140 which uses a light emitting diode which emits light of a range of blue wavelengths as the red light emitting device 120 does is disposed near the luminous light emitting device 100 together with the red light emitting device 120. Then, as shown in FIG. 9, light of the range of blue wavelengths emitted from the blue light emitting device 140 is caused to enter the light tunnel 81, which is the light distribution adjusting member, by using the second dichroic mirror 147.

Figure 9:
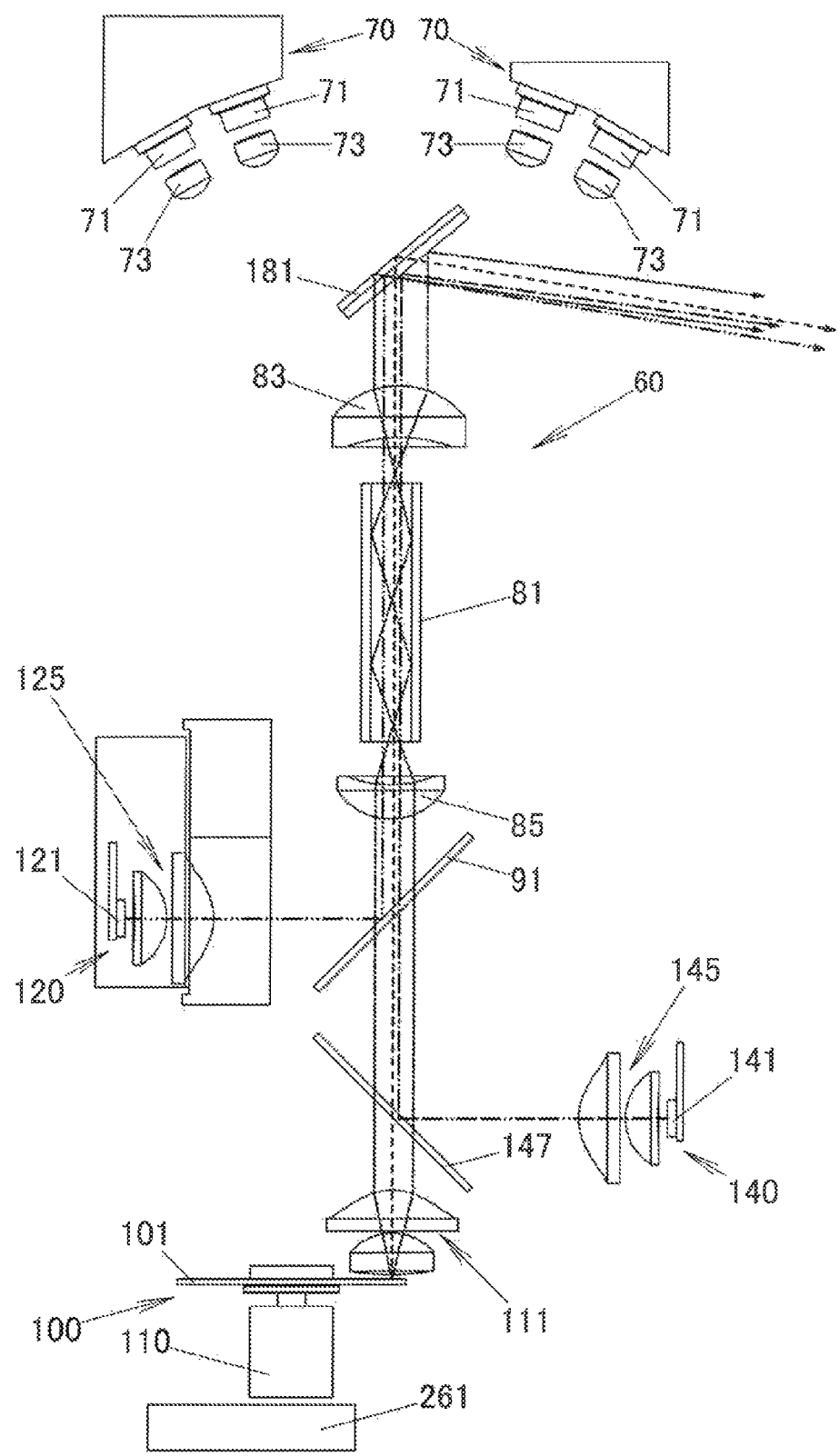
FIG. 9 shows a further construction example for the light source unit according to the embodiment of the invention.
Figure 10:
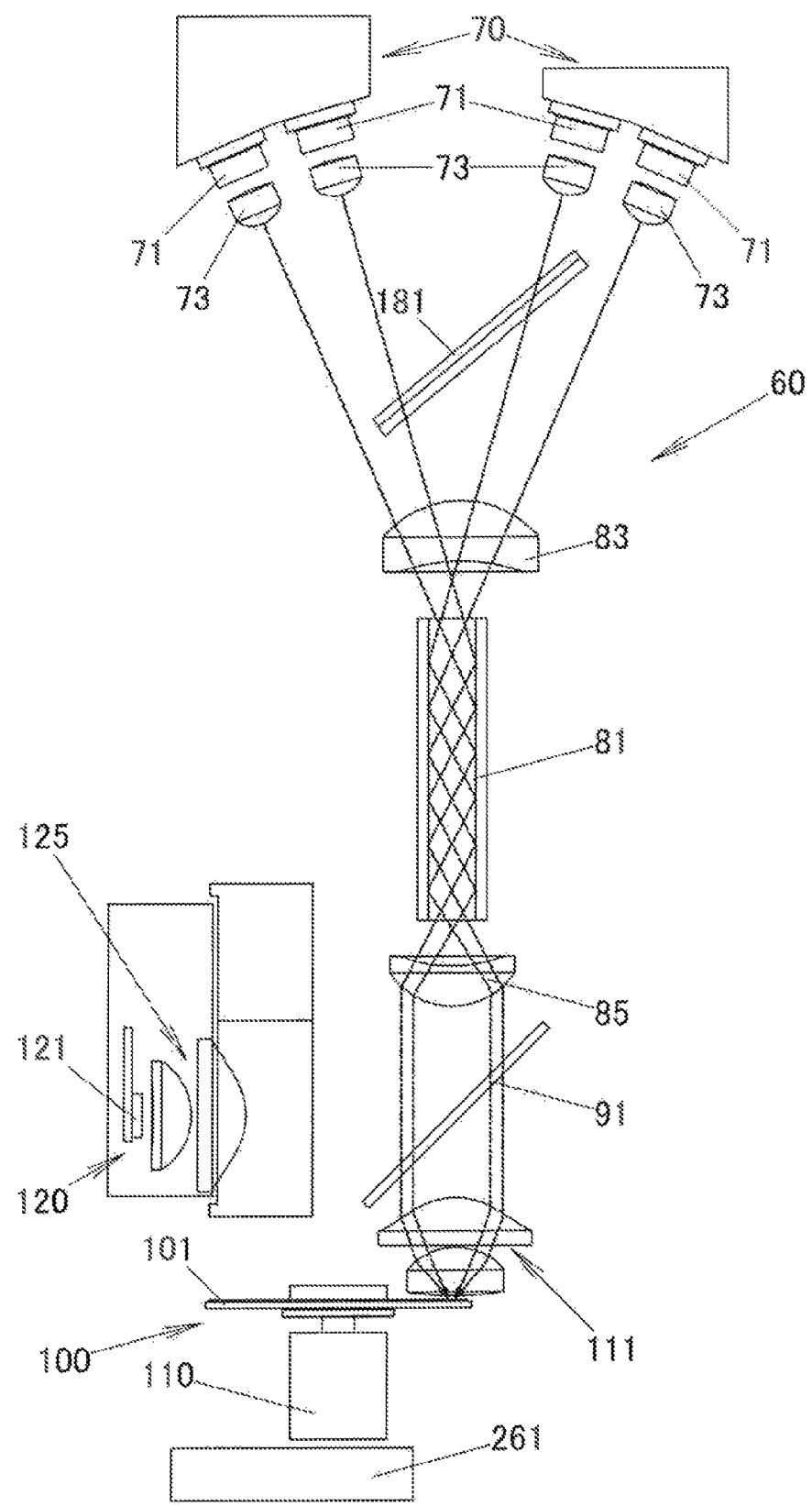
FIG. 10 shows a construction example for the light source unit according to the embodiment of the invention.

In FIG. 9, although pencils of luminous light emitted from the green luminescent material in every direction, light emitted from the blue light emitting device 140 and light emitted from the red light emitting device 120 are illustrated only by their central axes, in reality, it is, of course, natural to think that the light emitted from the luminescent material and the light emitting devices passes through the light tunnel 81 while being reflected internally.

In addition, in the embodiment, while the luminescent material layer 103 which is the green luminous light emitting area and the diffuse reflection portion 105 which is the diffuse reflection area are provided along the circumferential edge of the luminescent wheel 101 in the end-to-end fashion so as to be formed into an annular shape, a configuration may be adopted in which the diffuse reflection area is not formed, but a blue luminous light emitting area is formed by using a luminescent material which emits light of a range of blue wavelengths as a luminescent material which is applied on to a mirror-finished base.

When the luminescent material which emits light of the range of green wavelengths and the luminescent material which emits light of the range of blue wavelengths are formed into the annular shape on the luminescent wheel 101 in this way, as the excitation light sources, a laser emitting device is used which emits visible light of a shorter wavelength than those of light of the range of blue wavelengths or ultraviolet radiation.

Then, when laser emitting devices which output light of a shorter wavelength than those of light of the range of blue wavelengths such as ultraviolet light is used as the excitation light sources, a dichroic mirror which transmits light from the excitation light sources and reflects light of the range of green wavelengths and light of the range of blue wavelengths from the luminescent wheel 101 and light of the range of red wavelengths from the red light emitting device 120 is used as the light axis changing mirror 181 provided in the light-source-side optical system 180.

In this way, by using the dichroic mirror 181 as the light axis changing mirror 181 of the light-source-side optical system 180, when causing excitation light from the excitation light sources 70 to enter the light tunnel 81, excitation light does not have to be restricted by the light axis changing mirror 181 of the light-source-side optical system 180, that is, excitation light may enter the light axis changing mirror 181 of the light-source-side optical system 180, whereby the excitation light sources can be disposed so as to facilitate the adjustment of their positions relative to the optical axis of the light tunnel 81, which is the light distribution adjusting member, thereby making it possible to facilitate the design of arrangement of the laser emitting devices which constitute the excitation light sources.

Also when the dichroic mirror 181 is used as the light axis changing mirror 181, the invention is not limited to the configuration in which light of the range of green wavelengths and light of the range of blue wavelengths are emitted from the luminescent wheel 101, and hence, the configuration shown in FIG. 9 may be adopted in which the luminescent material layer 103 which constitutes the green luminous light emitting area is provided on the luminescent wheel 101 and the blue light emitting device 140 which shines light of the range of blue wavelengths is additionally provided.

In addition, when the dichroic mirror 181 is used as the light axis changing mirror 181, which transmits light from the excitation light sources and reflects light of the range of green wavelengths and light of the range of blue wavelengths which are emitted from the luminescent wheel 101 and light of the range of red wavelengths emitted from the red light emitting device 120, there may a situation in which the red light emitting device 120 which uses the red light emitting element which is the red light emitting diode is omitted and a luminescent material layer made up of a luminescent material which emits light of the range of red wavelengths is formed on the luminescent wheel 101 together with the luminescent material layers made up of the luminescent materials which emit light of the range of green wavelengths and light of the range of blue wavelengths.

In addition, the light tunnel 81, which is the light distribution adjusting member, is not limited to the light tunnel 81, and hence, there may be a situation in which a light guiding rod which is a solid glass rod is used in place of the light tunnel 81. Further, there may be a situation in which a microlens array is used as the light distribution adjusting member so as to make the intensity of light emanating therefrom distributed uniformly.

Figure 11:
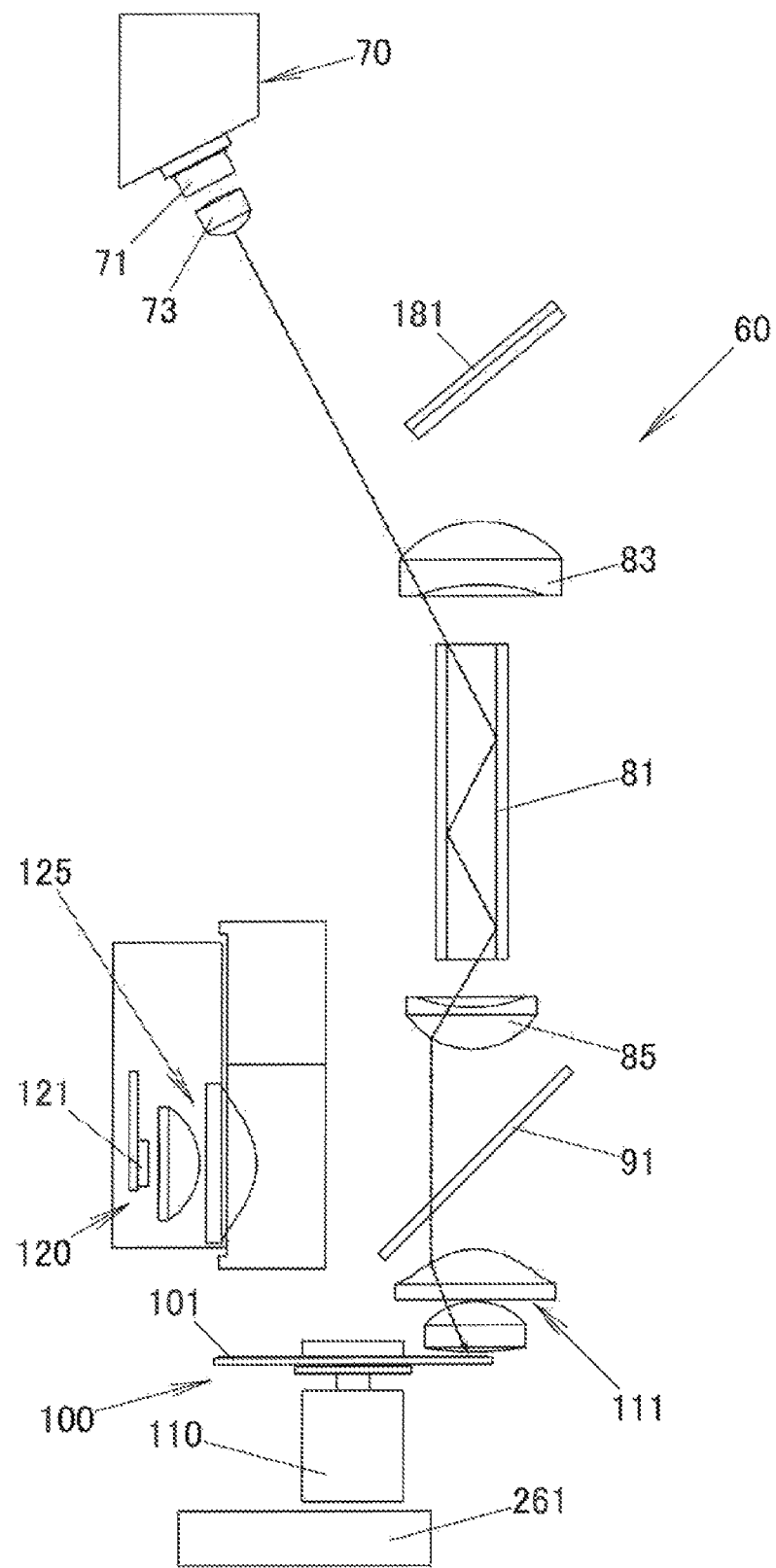
FIG. 11 shows another construction example for the light source unit according to the embodiment of the invention.

Further, in the embodiment, while the plurality of laser emitting devices are used as the excitation light sources, the invention is not limited to the use of the plurality of laser emitting devices. Hence, as shown in FIG. 11, a single laser emitting device may be used as the excitation light source. Incidentally, when the plurality of laser emitting devices are used, the in-plane uniformity in terms of luminance of light shone on to the luminescent wheel 101 can be enhanced through adjustment of respective positions of laser emitting devices.

In addition, when the plurality of laser emitting devices are used as the excitation light sources, the invention is not limited to the configuration in which the pairs of laser emitting devices are disposed substantially laterally symmetrical with respect to the central axis of the light tunnel 81 as shown in FIG. 4. Hence, the numbers of laser emitting devices to be disposed to the left and right of the central axis of the light tunnel 81 should be determined as required, and angles at which the axes of pencils of excitation light from the laser emitting devices intersect the central axis of the light tunnel 81 should also be determined as required.

In this way, in the case of the light source unit with the luminescent material according to this embodiment, since excitation light is shone on to the luminescent material via the light distribution adjusting member in shining excitation light on to the luminescent material, by allowing excitation light to pass through the light distribution adjusting member while being reflected in the interior thereof, the in-plane uniformity in terms of luminance of excitation light is enhanced, and hence, the in-plane uniformity of luminous light can be enhanced.

Consequently, it is possible to form a monochromatic image free from unevenness of luminance, thereby making it possible to provide the projector 10 which can project an image free from unevenness of luminance and a beautiful image free from partial color drift or partial unevenness of color.

In addition, by allowing excitation light to enter the light incident surface of the light distribution adjusting member such as the light tunnel 81 at a predetermined angle, the number of times of reflection of excitation light within the light distribution adjusting member can be adjusted, whereby the in-plane light distribution of excitation light emanating from the light distribution adjusting member can be made appropriate.

In addition, with luminous light caused to pass through the light distribution adjusting member in the opposite direction to the direction in which excitation light passes through it, the light distribution adjusting member can be used not only as the light distribution adjusting member which is required to make uniform light of the ranges of red, green and blue wavelengths which is to emanate from the light source unit but also as the light distribution adjusting member which distributes the intensity of excitation light uniformly, thereby making it possible to facilitate the reduction in size of the light source unit and hence the reduction in size of the projector 10.

In addition, with the light axis changing mirror 181 of the light-source-side optical system 180 disposed in the position where excitation light is not incident and between the excitation light sources and the light distribution adjusting member, the setting of a direction in which the light source unit 60 is disposed is facilitated.

Further, with the dichroic mirror which transmits excitation light and reflects luminous light from the luminescent material disposed between the excitation light sources and the light distribution adjusting member, the excitation light sources of the light source unit which emit light of the different range of wavelengths from that of light emitted from the luminescent material as excitation light can easily be disposed in the appropriate position.

In addition, when light emitted from the light source unit 60 is guided directly without using the light axis changing mirror 181, the projector 10 including the light source unit 60 can be simplified in construction.

Additionally, with the light source unit in which the collective lenses are disposed individually at the light entry side and the light emanating side of the light distribution adjusting member, not only excitation light is allowed to enter the light distribution adjusting member efficiently, but also the excitation light which has passed through the light distribution adjusting member can easily be collected to the required position on the luminescent material.

With the excitation light sources disposed in the symmetrical positions with respect to the straight line which passes through the middle point of the light incident surface of the light distribution adjusting member and which is normal to the light incident surface, thereby making it possible to facilitate the reduction in size of the excitation light sources while causing the excitation light from respective excitation light sources to effectively enter the light distribution adjusting member.

Further, with the excitation light sources disposed in the symmetrical positions with respect to the straight line which passes through the middle point of the light incident surface of the light distribution adjusting member and which is normal to the light incident surface so as to make equal the angles of incident at which excitation light from the left and right pairs of excitation light sources is incident on the light incident surface of the light distribution adjusting member, excitation light from the pairs of excitation light sources which are disposed symmetrically is allowed to pass through the light distribution adjusting member under the same conditions, thereby making it possible to realize an even in-plane light distribution.

Further, with the luminescent material layer 103 and the diffuse reflection portion 105 provided on the luminescent wheel 101, which is the circular rotational member, side by side with each other in the end-to-end fashion, light of the range of luminous light wavelengths and light of the range of excitation light wavelengths, which are different in color, can be produced by the light source unit made up of the excitation light sources and the luminous light emitting device 100.

In addition, with the excitation light sources made up of the laser emitting devices which emit light of the range of blue wavelengths and luminous light made up of light of the range of green wavelengths, it is possible to provide the high-intensity light source unit which forms and emits easily the two colors in the three primary colors which are necessary to form a color image.

In addition, the invention is not limited to the embodiments that have been described heretofore, and hence, the invention can be modified variously in stages where the invention is carried out without departing from the spirit and scope of the invention. Additionally, in carrying out the invention, the functions executed in the embodiments may be combined as required as much as possible. The embodiments include various stages, and various inventions can be extracted by appropriate combinations of the constituent elements disclosed. For example, as long as an advantage can be obtained even though some of all the constituent elements disclosed in the embodiments are deleted, the configuration in which some such constituent elements are deleted can be extracted as an invention.

What is claimed is:

1. A light source unit comprising:
   an excitation light source;
   a light distribution adjusting member on which excitation light from the excitation light source is incident; and
   a luminescent material which emits luminous light of a different wavelength from that of the excitation light by the excitation light which passes through the light distribution adjusting member being shone on thereto,
   wherein the excitation light source is disposed so that the excitation light is incident on a light incident surface of the light distribution adjusting member at a predetermined angle,
   wherein the light distribution adjusting member is disposed so that the luminous light enters the light distribution adjusting member from an opposite direction to a direction in which the excitation light enters the light distribution adjusting member, and
   wherein the light distribution adjusting member is configured to enhance in-plane uniformity of the excitation light emanating therefrom onto the luminescent material.

2. The light source unit according to claim 1, further comprising:
   a mirror which reflects at least the luminous light towards an exterior of the light source unit and which is disposed between the excitation light source and the light distribution adjusting member.

3. The light source unit according to claim 1, further comprising:

a mirror which reflects the luminescent light towards an exterior of the light source unit and which is disposed between the excitation light source and the light distribution adjusting member, wherein the excitation light source is disposed to be inclined at the predetermined angle with respect to the light incident surface of the light distribution adjusting member so that the excitation light does not enter the mirror but enters the light distribution adjusting member.

4. The light source unit according to claim 1, further comprising:

a dichroic mirror which transmits the excitation light and reflects the luminous light towards an exterior of the light source unit and which is disposed between the excitation light source and the light distribution adjusting member.

5. The light source unit according to claim 1, wherein the luminous light is guided directly to an exterior of the light source unit.

6. The light source unit according to claim 1, wherein collective lenses are disposed individually at an excitation light entry side and an excitation light emanating side of the light distribution adjusting member.

7. The light source unit according to claim 1, wherein the excitation light source comprises at least two or more excitation light sources, and the excitation light sources are disposed individually in symmetrical positions with respect to a straight line which passes through a middle point of the light incident surface of the light distribution adjusting member and which is normal to the light incident surface.

8. The light source unit according to claim 7, wherein excitation light which is emitted from one of the excitation light sources enters the light distribution adjusting member while being inclined at a first angle with respect to the straight line which is normal to the light incident surface, and wherein excitation light which is emitted from the other of the excitation light sources enters the light distribution adjusting member while being inclined at a second angle which has equal inclination with the first angle with respect to the straight line which is normal to the light incident surface.

9. The light source unit according to claim 1, wherein the luminescent material is provided on a rotational member, wherein the rotational member includes a diffuse reflection portion which diffuses and reflects the excitation light, and wherein the luminescent material is disposed on the rotational member so as to be provided side by side with the diffuse reflection portion in an end-to-end fashion.

10. The light source unit according to claim 9, wherein the excitation light source is a laser emitting device which emits light of a range of blue wavelengths, and wherein the luminescent material is a material which emits light of a range of green wavelengths.

11. A projector comprising:

the light source unit according to claim 1;

a display element which forms an optical image by light shone on thereto;

a light-source-side optical system which guides light from the light source unit to the display element;

a projection-side optical system which projects an optical image formed by the display element on to a screen; and a projector control unit having a light source control device for the light source unit and a display element control device.

* * * * *